Aug. 30, 1966 L. P. GOLONSKI 3,270,138

F.M. STEREOPHONIC RECEIVER HAVING NOISE PREVENTION MEANS IN THE PILOT CIRCUIT

Filed March 22, 1963

2 Sheets-Sheet 1

INVENTOR.
LESLIE P. GOLONSKI

BY

Mueller & Aichele

ATTYS.

INVENTOR.
LESLIE P. GOLONSKI
BY
Mueller & Aichele
ATTYS.

United States Patent Office 3,270,138

Patented August 30, 1966

3,270,138

F.M. STEREOPHONIC RECEIVER HAVING NOISE PREVENTION MEANS IN THE PILOT CIRCUIT

Leslie P. Golonski, Hanover Park, Ill., assignor to Motorola, Inc., Chicago, Ill., a corporation of Illinois Filed Mar. 22, 1963, Ser. No. 267,077
7 Claims. (Cl. 179—15)

Figure 1:
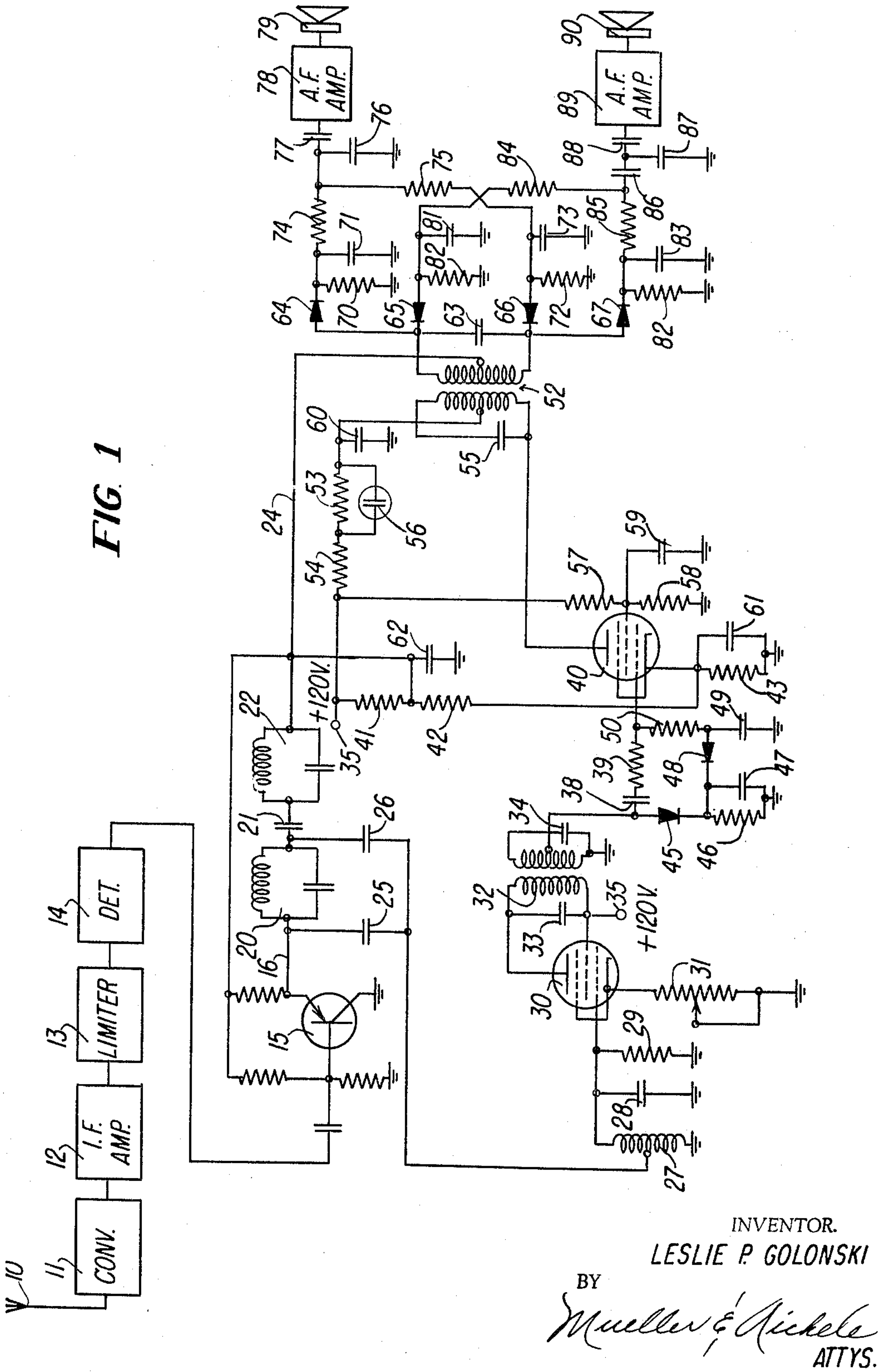

This invention relates generally to a system which responds to a desired pilot tone or alternating current wave, and more particularly to such a system which responds to the desired signal and is not responsive to random noise signals which may be received in the absence of the desired signal.

In many applications it is desired to produce a response to a continuous alternating current signal which may be a tone signal or a pilot wave and which does not respond to noise signals which may have components of the same frequency and which may be of greater amplitude than the desired signal. One such application is in a receiver for monophonic or stereophonic sound which provides stereophonic reproduction when a composite signal including a pilot signal is received and which provides monophonic reception when a signal is received which has no pilot signal. Such a receiver includes a circuit for producing the required demodulating wave, which is rendered operative by the pilot signal, and which also may include an indicator to shown the mode of operation. It is not practical in such systems to provide selectivity to exclude the noise signals, and it is therefore desired to suppress the response therefrom so that the system is not actuated thereby.

It is an object of the present invention to provide a simple system for responding to a continuous tone signal and which does not respond to a noise signal having random components of the same frequency of the tone signal and which are present in the absence of the tone signal.

Another object of the invention is to provide a system for producing a demodulating wave for stereophonic sound reproduction and which is normally inoperative, and which is rendered operative by the pilot tone signal but not by noise signals having the same frequency as the pilot signal and which may have greater amplitude than the pilot signal.

A further object of this invention is to provide a system responsive to the pilot tone signal of a composite stereo signal which operates an indicator to show when stereophonic reproduction is taking place, and wherein the indication is not produced by noise signals.

A feature of the invention is the provision of a system responsive to a pilot wave including tuned selective circuits and a rectifier for detecting the peaks of the selected wave, with a diode charging a capacitor from the rectified wave and presenting a high impedance to rising potentials so that the capacitor charges slowly, and a low impedance to falling potentials so that the capacitor discharges rapidly and follows the minimum values of the rectified wave.

Another feature of the invention is the provision of a frequency doubler stage for providing the demodulating wave for stereo reproduction, which is normally biased non-conducting, and a selective system responsive to a particular frequency for providing a voltage to the doubler stage for overcoming the bias thereon. The selective system includes a detector for detecting the peaks of the applied wave and a minimum riding circuit which follows the minimum values of the detected wave and applies the same to the stage to render it conducting. An indicator device such as a neon bulb may be connected to the frequency doubler stage to be illuminated when the stage is rendering conducting to indicate the operation thereof.

Figure 2:
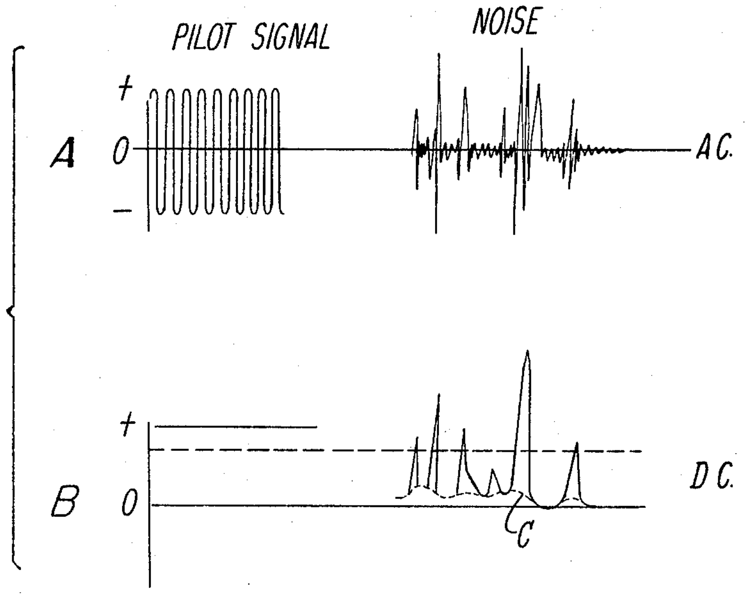

The invention is illustrated in the drawings wherein:

FIG. 1 is a schematic diagram of a stereophonic receiver including the tone detecting system of the invention;

FIG. 2 includes curves illustrating operation of the detecting system; and

Figure 3:
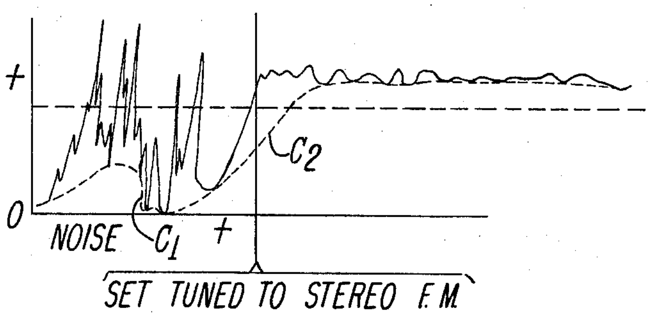

FIG. 3 shows the operation of the system as a stereo signal is tuned in.

The invention is illustrated in a frequency modulation receiver which provides monophonic and stereophonic reception, and which receives a composite stereo signal including a stereo sum signal, a stereo difference signal as an amplitude modulated suppressed carrier wave and a pilot tone signal having a frequency one half that of the suppressed carrier wave. The pilot signal is derived from the received composite signal by a filter tuned to the pilot frequency. The selected signal is applied to a peak detector which has a load impedance across which the detected signal is applied. A capacitor is coupled to the load impedance by a rectifier which is poled to present a high impedance when the voltage across the load is greater than that across the capacitor. The capacitor, therefore, charges slowly to the voltage developed across the load. As the rectifier has low impedance when the voltage across the capacitor is greater than the voltage across the load, the capacitor discharges rapidly when the load voltage decreases and therefore follows the minimum values of the load voltage. The demodulating wave for the stereo detector may be provided by a frequency doubler stage including an electron device biased to be non-conducting, and an output circuit tuned to the doubled frequency and having a neon bulb which glows when the electron device conducts. The voltage across the capacitor is applied to the electron device to overcome the bias when the pilot tone is received, so that the voltage doubler circuit is operative and the neon bulb glows. However, when noise is received the voltage across the recifier load includes components falling to a low value and the voltage across the capacitor follows these components and does not rise to the value required to render the electron device conducting.

In FIG. 1 of the drawing, there is shown a frequency modulation receiver including an antenna 10 for applying radio frequency signals to an input stage such as converter 11. Intermediate frequency signals are developed in the converter and applied to intermediate frequency amplifier 12. The amplified intermediate frequency signals are applied to limiter 13 and then to detector 14. The detected frequency modulation signal may be a monaural audio signal or a stereophonic signal which is a composite signal including a sum stereo signal made up of the signals for the right and left stereo channel signals, the difference between the right and left stereo channel signals modulated on a suppressed carrier wave, and a pilot signal having a frequency one half that of the carrier frequency of the suppressed carrier wave.

The monaural or composite stereo signal is applied to an emitter follower stage including transistor 15. The output of the emitter follower stage is applied by conductor 16 to trap circuit 20, capacitor 21 and trap circuit 22 to conductor 24, which applies the composite signal to the stereo detector circuit. The trap circuits 20 and 22 may be provided to remove higher frequency sub-carriers which are used in certain applications to provide additional communication channels.

The pilot signal is derived from the detected output through capacitors 25 and 26 coupled to inductor 27. Inductor 27 is a high-Q coil tuned by capacitor 28 to form a filter to select the pilot signal, which is at a frequency of 19 kilocycles. The selected signal is applied to the grid of pentode amplified tube 30, the grid thereof being returned to ground by resistor 29. The cathode of the amplifier 30 is grounded through resistor 31 and the plate is connected through primary winding of transformer 32 to the positive potential supply 35. The primary winding of transformer 32 is tuned by capacitor 33, with the secondary winding being tuned by capacitor 34. The tuned transformer coupling provides further selection of the 19 kilocycle pilot signal.

The pilot signal is coupled through capacitor 38 and resistor 39 to the grid of tube 40 of the frequency doubler stage. The tube 40 is biased off by the cathode pontential applied from source 35 through the voltage divider including resistors 41, 42 and 43, so that this tube is normally nonconducting.

The plate of tube 40 is connected through the primary winding of transformer 52 and resistors 53 and 54 to the positive potential supply. The primary winding of transformer 52 is tuned by capacitor 55 to 38 kilocycles or twice the frequency of the pilot tone. Accordingly the doubled frequency will appear across this tuned circuit when tube 40 conducts and the pilot tone is applied to the grid thereof. During such conduction neon bulb 56 will glow to indicate that a stereo signal is being received. Resistors 57 and 58 provide potential to the screen grid of tube 40, with capacitor 59 providing a bypass. Capacitor 60 provides a bypass for the plate potential, and capacitor 61 and 62 bypass the sections of the voltage divider connected to the cathode. It is pointed out that the voltage dividers 41, 42 and 43 also provide a potential for operating the transistor 15 of the emitter follower stage.

The secondary winding of transformer 52 is tuned by capacitor 63, and the received signal on conductor 24 is applied to the center tap of this winding. The received signal is combined in this winding with the 38 kilocycle signal developed when the pilot signal is received. That is, the stereo sum signal, the different signal amplitude modulated on the suppressed carrier wave, and the locally supplied demodulating wave at the suppressed carrier frequency are combined, and applied to the four diodes 64, 65, 66 and 67. It is pointed out that the phase of the wave applied to diodes 64 and 65 is opposite to that applied to diodes 66 and 67.

The diodes 64 and 66 form a push-pull synchronous detector which produces the left channel stereo signal. Diode 64 rectifies the envelope of the modulated subcarrier wave of one polarity, and applies the same with the sum signal to the load impedance formed by resistor 70 and capacitor 71. Detector 66 receives signals of the opposite polarity from transformer 52 and is poled to detect the opposite polarity envelope to provide a detected signal across the load formed by resistor 72 and capacitor 73, which because of the two reversals, is of the same polarity as that across the load formed by resistor 70 and capacitor 71. The two signals are mixed at the outputs of resistors 74 and 75 and appear across capacitor 76, which is coupled through capacitor 77 to the audio amplifier 78 and loudspeaker 79 which amplify and reproduce the left channel output.

Diodes 65 and 67 similarly develop the right channel output, with resistor 80 and capacitor 81 forming the load for detector 65, and resistor 82 and capacitor 83 forming the load for detector 67. The two outputs are mixed at the output of resistors 84 and 85 and applied through capacitor 86 and across capacitor 87 which provides the right channel output. This output is coupled through capacitor 88 to audio frequency amplifier 89 and loudspeaker 90 which amplify and reproduce the right channel output.

A bias voltage is developed from the pilot signal itself to overcome the bias holding tube 40 cut off, so that the frequency doubler will operate to double the pilot frequency when the pilot signal is present. This bias voltage circuit includes diode 45 which provides a potential across the load formed by resistor 46 bypassed by capacitor 47. In FIG. 2 the left portion of curve A shows the pilot signal, and the left side of curve B shows the rectified output produced therefrom and developed across load resistor 46. This rectified potential is applied through diode 48 to capacitor 49. The diode 48 is poled so that it presents a high impedance to the flow of current to charge capacitor 49 from the voltage across the load including resistor 46 and capacitor 47. However, if the continuous pilot signal provides a voltage across the load for a period of time, the capacitor 49 will charge to this voltage. The voltage across capacitor 49 is applied through resistor 50 to the grid of tube 40 to overcome the bias on the cathode so that tube 40 conducts.

As has been stated, noise having components of the frequency of the pilot signal, or 19 kilocycles, may appear with the signal detected by the FM receiver in the absence of a stereo signal, and will pass through the filter including coil 27 and capacitor 28 and the tuned amplifier including transformer 32 to the rectifier system providing bias for the tube 40. This signal will be rectified by rectifier 45 and appear across load resistor 46. This rectified voltage might have pulses of sufficient amplitude that if directly connected to the grid of tube 40, would cause the tube 40 to conduct. This would cause neon bulb 56 to glow indicating that a stereo signal is being received. This is obviously undesired.

Response of the tube 40 to noise signals is prevented by the circuit including rectifier 48 and capacitor 49. The noise signal applied to the rectifier 45 is represented by the right portion of curve A in FIG. 2 and the rectified signal appearing across load resistor 46 and capacitor 47 is represented by the solid line at the right side of curve B. The cathode of tube 40 of the frequency doubler is biased so that it will not conduct until the voltage applied to the grid exceeds the value shown by the dotted line. As shown by the left part of curve B, the rectified voltage derived from the pilot tone, represented by the solid line, exceeds the value required to render tube 40 conducting. The rectified voltage provided by noise, shown at the right side of curve B, will also exceed the value (dotted line) required to render tube 40 conducting on the peaks of the noise. If this voltage is applied to the grid of tube 40, an output will be produced in the transformer 52 and the neon bulb 56 will glow.

As previously stated, the rectifier 48 is connected in the circuit so that it presents a high impedance to current flow when the voltage across resistor 46 exceeds that across capacitor 49 so that capacitor 49 will charge very slowly. However, when the voltage across capacitor 49 exceeds that across resistor 46, the diode 48 will have a low impedance and the capacitor 49 will rapidly discharge to the value of the resistor 46. This forms what might be called a *minimum riding circuit* whereby the voltage across capacitor 49 follows the minimum values of the voltage across resistor 46. The voltage produced across capacitor 49 in response to noise is shown by the dotted curve marked C at the right of curve B. Although this voltage will tend to rise when the rectified voltage across resistor 46 rises, it will rise very slowly, and as the noise pulses are of short duration it will not rise to the value required to render tube 40 conducting, represented by the dotted line. As soon as the rectified noise falls to a minimum value, the capacitor 49 will immediately discharge to this value, so that it is substantially below the value required to render tube 40 conducting.

The action of the system is illustrated in FIG. 3 which represents the condition wherein a monaural signal is being received and there is no pilot signal, and noise is applied through the circuit to rectifier 45, and then a stereo signal is tuned in and the pilot signal is received. It will be noted that at the left side of FIG. 3, when only noise is received, the curve $C_1$ representing the voltage across capacitor 49 never rises to the dotted line curve at which tube 40 conducts. However, when the pilot tone is received for a length of time and the rectified voltage across resistor 46 is maintained at a substantially constant value, the voltage across capacitor 49 gradually rises, as indicated at $C_2$. After a short time it reaches a value above that of the dotted line, and then remains above this value. Although slight variations will occur in the rectified output resulting from the pilot tone due to variations in transmission, the level at which tube 40 is rendered conducting is selected so that the tube 40 remains continually conducting to provide the double frequency demodulating wave for the stereo detection system, and the indicator light 56 glows continuously.

In a system which has been found to operate satisfactorily the following component values were used:

| | |
|---|---|
| Capacitor 38 | .01 microfarads. |
| Resistor 39 | 120,000 ohms. |
| Diode 45 | Type 1S34. |
| Resistor 46 | 33,000 ohms. |
| Capacitor 47 | .05 microfarads. |
| Diode 48 | Type 1S34. |
| Capacitor 49 | .05 microfarads. |
| Resistor 50 | 100,00 ohms. |

The system has been found to be highly satisfactory to prevent injection of the demodulating wave when a monaural signal is being received and there is no pilot tone. This is important as the demodulating wave tends to produce noise during monaural reception. Also intermittent operation of the frequency doubler circuit by noise pulses is objectionable. Although the circuit producing the demodulating wave has been described as a frequency doubler circuit, an oscillator synchronized by the pilot tone could also be used. Such an oscillator could also be biased to be non-conducting, with a circuit as described providing a bias in response to the pilot tone to render the oscillator conducting.

Although greater selectivity with respect to noise might be provided in the pilot tone selecting system by the use of higher-Q coils, this results in substantial additional cost and also has the disadvantage that the phase of the pilot carrier is changed to render the stereo detector system more critical. This may also emphasize problems resulting from changes in temperature and aging of components. Various other circuits could be used for providing discrimination against noise but these would all involve substantial cost, whereas the circuit of the invention requires only the addition of a diode and a capacitor. This circuit has been found to be highly effective in actual use.

The circuit described is therefore effective to produce a response when a pilot wave or signal is received, and to be unresponsive to noise having the frequency of the pilot wave and which may have amplitude peaks greater than that of the pilot wave. This circuit is simple and can be constructed with inexpensive components so that it can be provided at low cost. The circuit is particularly adaptable for use in a stereophonic sound receiver in that it responds to the pilot wave to render a circuit operative to produce the frequency required for demodulating the suppressed carrier wave. This circuit also actuates an indicator to show that a stereo signal is being received and that stereophonic reproduction is taking place.

I claim:

1. A system for responding to a continuous wave of a predetermined frequency and which discriminates against noise signals including components of the predetermined frequency which may be present in the absence of the continuous wave, said system including in combination, a rectifier circuit including a load impedance across which a direct current voltage is developed from the continuous wave and which may include components resulting from noise signals, and a minimum riding circuit including capacitor means and rectifier means connecting said capacitor means to said load impedance, said rectifier means being constructed and poled to present a high resistance when the voltage across said impedance means is greater than that across said capacitor means so that said capacitor means charge slowly to the voltage across said load impedance, said rectifier means presenting a relatively low resistance when the voltage across said capacitor means is greater than that across said impedance means so that said capacitor means discharges rapidly to the voltage across said impedance means.

2. A system for responding to a continuous wave of a predetermined frequency and which discriminates against noise signals including components of the predetermined frequency which may be present in the absence of the continuous wave, said system including in combination, a peak rectifier circuit including a load impedance across which a direct current voltage is developed which follows the peaks of the applied signal and which may include components resulting from noise signals, a minimum riding circuit including capacitor means and rectifier means connecting said capacitor means to said load impedance, said rectifier means being constructed and poled to present a high resistance when the voltage across said impedance means is greater than that across said capacitor means so that the voltage across said capacitor means rises slowly, said rectifier means presenting relatively low resistance when the voltage across said capacitor means is greater than that across said impedance means so that the voltage across said capacitor means rapidly drops to the voltage across said impedance means, and responsive means coupled to said capacitor means and operative when the voltage thereacross exceeds a predetermined value, with the continuous wave producing a relatively constant voltage across said impedance means which is developed across said capacitor means to cause operation of said responsive means, and the noise signals producing a voltage across said impedance means having minimum values which fall below said predetermined value, with the voltage across said capacitor means following said minimum values and remaining below said predetermined value so that said responsive means is not operated.

3. A system for responding to a continuous wave of a predetermined frequency and which discriminates against noise signals including components of the predetermined frequency which may be present in the absence of the continuous wave, said system including in combination, rectifier means including a first rectifier element and load means across which the rectified continuous wave and noise signal components are developed, a capacitor, and a second rectifier element connecting said capacitor to said load means for charging said capacitor therefrom, said second rectifier element being constructed and poled to have a high impedance to current flow for charging said capacitor from said load means so that the voltage across said capacitor charges slowly to approach the voltage across said load means, said second rectifier element having a low impedance to current flow for discharging said capacitor so that said capacitor discharges rapidly to the voltage across said load, whereby a voltage is developed across said capacitor by the continuous wave having a substantially constant value substantially equal to the voltage across said load means, and such voltage follows the minimum values of the voltage produced across said load means by the noise signal components.

4. In a radio receiving system for receiving monophonic and stereophonic sound, and wherein the received carrier wave for stereophonic reception is frequency modulated by a composite signal including a stereo sum signal, a suppressed carrier wave amplitude modulated by a stereo difference signal, and a pilot signal having a frequency one half that of the suppressed carrier wave, and wherein noise having components of the frequency of the pilot signal may be present in the absence of the composite signal, the combination including, a frequency selective system for deriving the pilot signal from the composite wave, a frequency doubler circuit responsive to the pilot signal for producing a wave having twice the frequency of the pilot signal, said frequency doubling circuit including an electron device biased to be normally non-conducting, rectifier means coupled to said selective system and responsive to the pilot signal for selectively rendering said electron device conducting, said rectifier means including a first rectifier element and load means across which the rectified pilot signal and noise components are developed, a capacitor, a second rectifier element connecting said capacitor to said load means for charging said capacitor therefrom, said second rectifier element being constructed and poled to have a high impedance to current flow for charging said capacitor from said load means so that the voltage across said capacitor rises slowly to approach the voltage across said load means, said second rectifier element having a low impedance to current flow for discharging said capacitor so that said capacitor discharges rapidly to the voltage across said load, and means coupling said capacitor to said electron device for applying the voltage across said capacitor thereto to control the conductivity of said electron device.

5. In a radio receiving system for receiving monophonic and stereophonic sound, and wherein the received carrier wave for stereophonic reception is frequency modulated by a composite signal including a stereo sum signal, a suppressed carrier wave amplitude modulated by a stereo difference signal, and a pilot signal having a frequency one half that of the suppressed carrier wave, and wherein noise having components of the frequency of the pilot signal may be present in the absence of the composite signal, the combination including, a frequency selective system for deriving the pilot signal from the composite wave, demodulator means for producing right and left channel stereo signals from the stereo sum signal and the suppressed carrier wave, a frequency doubler stage responsive to the pilot signal for applying to said demodulator means a demodulating wave having twice the frequency of the pilot signal, said frequency doubler stage including an electron device biased to be normally non-conducting and indicator means to indicate when said device is conducting, rectifier means coupled to said selective system and responsive to the pilot signal for selectively rendering said electron device conducting, said rectifier means including a first rectifier element and load means across which the rectified pilot signal and noise components are developed, a capacitor, a second rectifier element connecting said capacitor to said load means for charging said capacitor therefrom, and means coupling said capacitor to said electron device for applying the voltage across said capacitor thereto, said second rectifier element being constructed and poled to have a high impedance to current for charging said capacitor from said load means so that the voltage across said capacitor rises slowly to approach the voltage across said load means to render said electron device conductive when the pilot signal is received, said second rectifier element having a low impedance to current for discharging said capacitor so that said capacitor discharges rapidly to the voltage across said load and follows the minimum values of the rectified noise components so that the voltage across said capacitor is insufficient to render said electron device conductive in the absence of the pilot signal.

6. In a radio receiving system for receiving monophonic and stereophonic sound, and wherein the received carrier wave for stereophonic reception is frequency modulated by a composite signal including a stereo sum signal, a suppressed carrier wave amplitude modulated by a stereo difference signal, and a pilot signal having a frequency one half that of the suppressed carrier wave, and wherein noise having components of the frequency of the pilot signal may be present in the absence of the composite signal, the combination including, a frequency selective system for deriving the pilot signal from the composite wave, demodulator means for producing right and left channel stereo signals from the stereo sum signal and the suppressed carrier wave, a frequency doubler stage responsive to the pilot signal for applying to said demodulator means a demodulating wave having twice the frequency of the pilot signal, said frequency doubling stage including an electron device biased to be normally non-conducting, and an output circuit including an indicator light to indicate when said device is conducting, rectifier means coupled to said selective system and responsive to the pilot signal for selectively rendering said electron device conducting, said rectifier means including a first rectifier element and a load means across which the rectified pilot signal and noise components are developed, a capacitor, a second rectifier element connecting said capacitor to said load means for charging said capacitor therefrom, and means coupling said capacitor to said electron device for applying the voltage across said capacitor thereto, said second rectifier element being constructed and poled to have a high impedance to current for charging said capacitor from said load means so that the voltage across said capacitor rises slowly to approach the voltage across said load means, said capacitor charging when the pilot light is received for a predetermined time to render said electron device conductive so that said indicator light is energized, said second rectifier element having a low impedance to current flow for discharging said capacitor so that said capacitor discharges rapidly to the voltage across said load, whereby the voltage across said capacitor follows the minimum values of the rectified noise components and the voltage across said capacitor resulting from noise components is insufficient to render said electron device conductive.

7. In a radio receiving system for receiving monophonic and stereophonic sound, and wherein the received carrier wave for stereophonic reception is frequency modulated by a composite signal including a stereo sum signal, a suppressed carrier wave amplitude modulated by a stereo difference signal, and a pilot signal having a frequency one half that of the suppressed carrier wave, and wherein noise having components of the frequency of the pilot signal may be present in the absence of the composite signal, the combination including, a frequency selective system for deriving the pilot signal from the composite wave, demodulator means for producing right and left channel stereo signals from the stereo sum signal and the suppressed carrier wave, a frequency doubler stage responsive to the pilot signal for applying to said demodulator means a demodulating wave having twice the frequency of the pilot signal, said frequency doubler stage including a vacuum tube having a cathode a control grid and an anode, bias means connected to said cathode and applying a potential thereto for normally holding said tube non-conducting, an output circuit connected to said anode including a circuit tuned to twice the frequency of the pilot signal, a neon bulb in said output circuit which glows when said valve conducts to indicate when the pilot signal is received, rectifier means coupled to said selective system and responsive to the pilot signal for selectively rendering said vacuum tube conducting, said rectifier means including a first rectifier element and load means across which the rectified pilot signal and noise components are developed, a capacitor, a second rectifier element connecting said capacitor to said load means for charging said capacitor therefrom, and means coupling said capacitor to said control grid of said vacuum tube for applying the voltage across said capacitor thereto, said second rectifier element being constructed and poled to have a high impedance to current flow for charging said capacitor from said load means so that the voltage across said capacitor rises slowly to approach the voltage across said load means, said capacitor charging when the pilot signal is received for a predetermined time to render said vacuum tube conductive so that said neon bulb glows, said second rectifier element having a low impedance to current flow for discharging said capacitor so that said capacitor discharges rapidly to the voltage across said load, whereby the voltage across said capacitor follows the minimum values of the rectified noise components and the voltage across said capacitor resulting from noise components is insufficient to render said vacuum tube conductive.

References Cited by the Examiner

UNITED STATES PATENTS

| | | | |
|---|---|---|---|
| 3,076,939 | 2/1963 | Wycoff | 325—477 XR |
| 3,198,885 | 8/1965 | Limberg | 179—15 |

DAVID G. REDINBAUGH, *Primary Examiner.*

R. L. GRIFFIN, *Assistant Examiner.*